(12) United States Patent
Khan et al.

(10) Patent No.: US 8,503,560 B2
(45) Date of Patent: Aug. 6, 2013

(54) SYSTEM AND METHOD FOR PERFORMING PRECODING IN A WIRELESS COMMUNICATION SYSTEM

(75) Inventors: Farooq Khan, Allen, TX (US);
Jiann-An Tsai, Plano, TX (US);
Cornelius van Rensburg, Dallas, TX (US); Yinong Ding, Plano, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 840 days.

(21) Appl. No.: 11/824,832

(22) Filed: Jul. 3, 2007

(65) Prior Publication Data

US 2008/0080637 A1 Apr. 3, 2008

Related U.S. Application Data

(60) Provisional application No. 60/848,843, filed on Oct. 2, 2006.

(51) Int. Cl.
*H04B 7/02* (2006.01)

(52) U.S. Cl.
USPC ........... 375/267; 375/299; 375/260; 375/347; 375/322; 704/219; 455/562.1; 455/101

(58) Field of Classification Search
USPC ......................................... 375/267, 260, 299
See application file for complete search history.

(56) References Cited

U.S. PATENT DOCUMENTS

| | | | |
|---|---|---|---|
| 6,320,540 B1 * | 11/2001 | Meredith | 342/377 |
| 7,092,450 B1 | 8/2006 | Al-Dhahir | |
| 7,336,727 B2 * | 2/2008 | Mukkavilli et al. | 375/299 |
| 2006/0209923 A1 | 9/2006 | Jin et al. | |
| 2007/0041457 A1 * | 2/2007 | Kadous et al. | 375/260 |
| 2007/0211813 A1 * | 9/2007 | Talwar et al. | 375/267 |
| 2007/0263746 A1 * | 11/2007 | Son | 375/267 |
| 2008/0232503 A1 * | 9/2008 | Kim | 375/267 |
| 2008/0292013 A1 * | 11/2008 | Varadarajan et al. | 375/260 |
| 2010/0074360 A1 * | 3/2010 | Lee et al. | 375/267 |

FOREIGN PATENT DOCUMENTS

WO WO 2004/077734 A2 9/2004

OTHER PUBLICATIONS

Mondal et al, On Limited Feedback MIMO Beamforming Systems, Jul. 2004, p. 1-39.*
International Search Report issued on Jan. 8, 2008 in International Application No. PCT/KR2007/004717.
European Search Report issued on Mar. 3, 2008 in European Patent Application No. 07 01 9335.
David J. Love et al., "Limited Feedback Unitary Precoding for Orthogonal Space-Time Block Codes", IEEE Transactions on Signal Processing, vol. 53, No. 1, Jan. 2005, pp. 64-73.
David J. Love et al., "Limited Feedback Unitary Precoding for Spatial Multiplexing Systems", IEEE Transactions on Information Theory, vol. 51, No. 8, Aug. 2005, pp. 2967-2976.
Zhihong Hong et al., "Spatial Multiplexing in Correlated Fading via the Virtual Channel Representation", IEEE Journal on Selected Areas in Communication, IEEE Service Center, vol. 21, No. 5, Jun. 2003, pp. 856-866.

\* cited by examiner

*Primary Examiner* — Eva Puente (57) ABSTRACT

A base station capable of performing precoding in a wireless communication system is provided. The base station includes a plurality of codebooks and a codebook selector. Each codebook comprises a plurality of composite precoding matrices that are generated based on a corresponding diversity precoding matrix. The codebook selector is operable to select one of the codebooks for use in a communication session with a subscriber station.

20 Claims, 7 Drawing Sheets

SYSTEM AND METHOD FOR PERFORMING PRECODING IN A WIRELESS COMMUNICATION SYSTEM

CROSS-REFERENCE TO RELATED APPLICATION AND CLAIM OF PRIORITY

The present application is related to U.S. Provisional Patent No. 60/848,843, filed Oct. 2, 2006, titled "Precoding for a MIMO Wireless Communication System." U.S. Provisional Patent No. 60/848,843 is assigned to the assignee of the present application and are hereby incorporated by reference into the present disclosure as if fully set forth herein. The present application hereby claims priority under 35 U.S.C. §119(e) to U.S. Provisional Patent No. 60/848,843.

TECHNICAL FIELD OF THE INVENTION

The present disclosure relates generally to wireless communications and, more specifically, to a system and method for performing precoding in a wireless communication system.

BACKGROUND OF THE INVENTION

Currently-implemented multiple input/multiple output (MIMO) wireless communication systems sometimes employ unitary precoding prior to mapping data streams to physical antennas in order to create a set of virtual antennas. This allows each codeword to be transmitted from all the physical antennas. However, this precoding is performed for spatial multiplexing only. When the system is using transmit diversity, precoding is not available, resulting in decreased performance. Therefore, there is a need in the art for a system for performing precoding with both spatial multiplexing and transmit diversity in a wireless communication system.

SUMMARY OF THE INVENTION

A base station capable of performing precoding in a wireless communication system is provided. According to an advantageous embodiment of the present disclosure, the base station includes a plurality of codebooks and a codebook selector. Each codebook comprises a plurality of composite precoding matrices that are generated based on a corresponding diversity precoding matrix. The codebook selector is operable to select one of the codebooks for use in a communication session with a subscriber station.

According to another embodiment of the present disclosure, a base station capable of performing precoding in a wireless communication system is provided that includes a precoder. The precoder is operable to perform precoding on a plurality of data streams using a composite precoding matrix.

According to yet another embodiment of the present disclosure, a method for performing precoding in a wireless communication system is provided that includes storing a plurality of codebooks. Each codebook comprises a plurality of composite precoding matrices that are generated based on a corresponding diversity precoding matrix. One of the codebooks is selected for use in a communication session with a subscriber station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless network.

Figure 1:
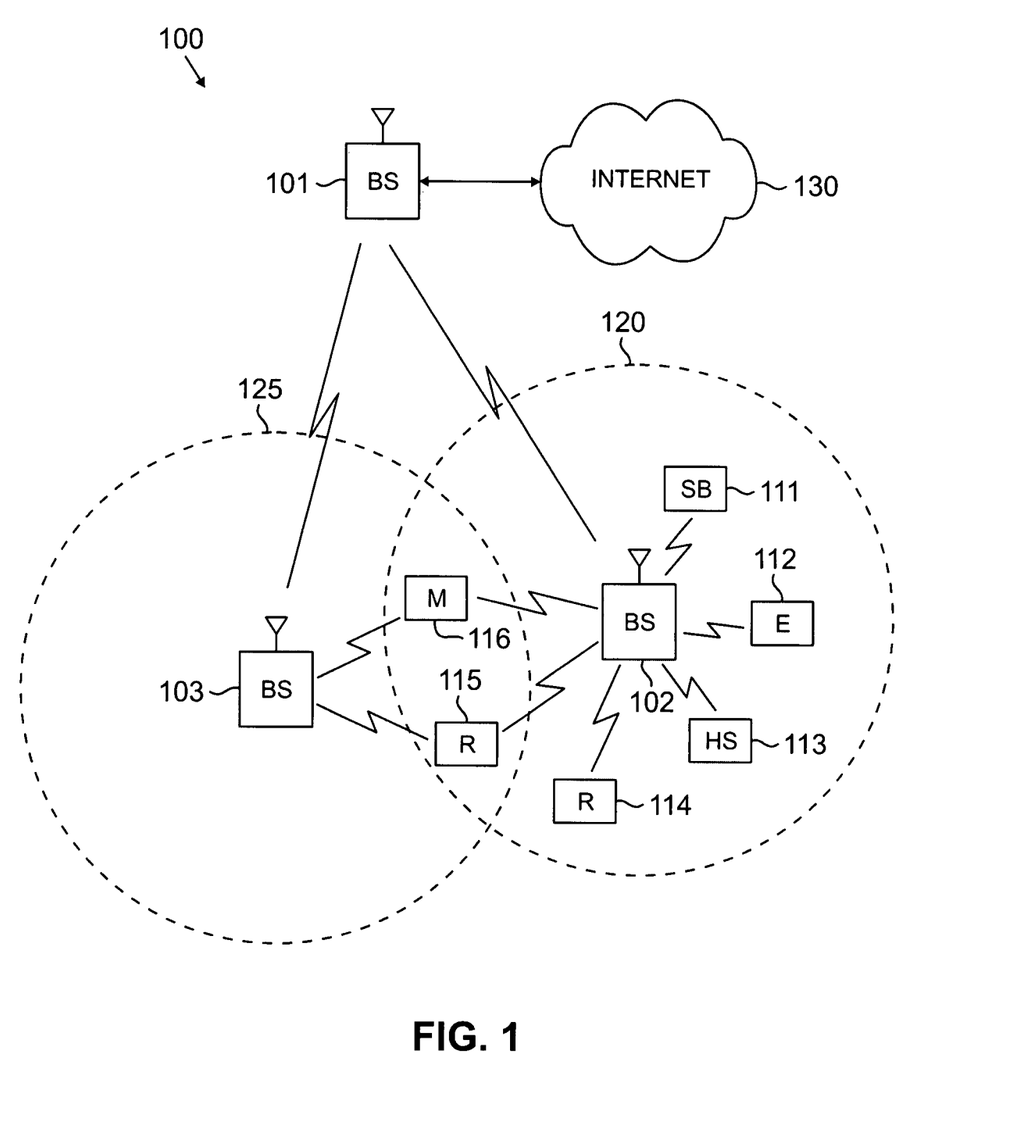
FIG. 1 illustrates an orthogonal frequency division multiplexing (OFDM) wireless network that is capable of providing precoded signals according to an embodiment of the present disclosure.

FIG. 1 illustrates an exemplary Orthogonal Frequency Division Multiplexing (OFDM) wireless network 100 that is capable of providing precoded signals according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in soft handoff, as known to those of skill in the art.

In an exemplary embodiment, base stations 101-103 may communicate with each other and with subscriber stations 111-116 using an IEEE-802.16, 802.20, or 802.11 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight with base station 102 and base station 103. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from about 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. The servers, Internet gateway, and public switched telephone network gateway are not shown in FIG. 1. In another embodiment, the connection to network 130 may be provided by different network nodes and equipment.

In accordance with an embodiment of the present disclosure, each base station 101-103 is operable to precode signals using a composite precoding matrix that provides power-sharing and diversity characteristics. Using this composite precoding matrix allows base stations 101-103 to take advantage of precoding whether spatial multiplexing or transmit diversity is used. In addition, for one embodiment of the present disclosure, each base station 101-103 is operable, for each communication session, to select a codebook of composite precoding matrices from a plurality of possible codebooks and to use one or more of the composite precoding matrices within the selected codebook for that communication session.

Figure 2:
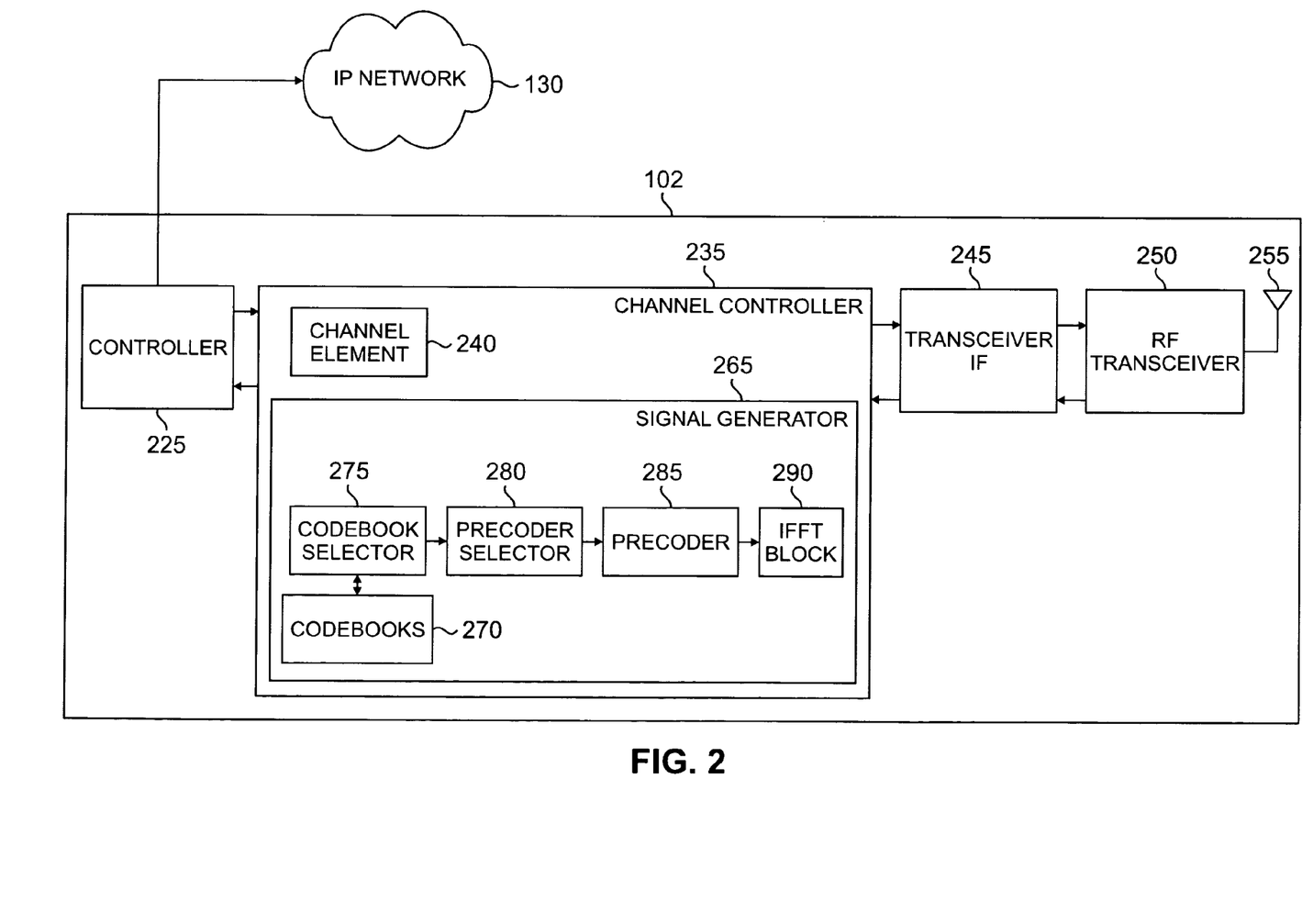
FIG. 2 illustrates an exemplary base station that is capable of performing precoding according to an embodiment of the present disclosure.

FIG. 2 illustrates exemplary base station 102 in greater detail according to one embodiment of the present disclosure. Base station 102 is illustrated by way of example only. However, it will be understood that the components illustrated and described with respect to base station 102 are also part of base stations 101 and 103. In one embodiment, base station 102 comprises controller 225, channel controller 235, transceiver interface (IF) 245, radio frequency (RF) transceiver unit 250, and antenna array 255.

Controller 225 comprises processing circuitry and memory capable of executing an operating program that controls the overall operation of base station 102. In an embodiment, controller 225 may be operable to communicate with network 130. Under normal conditions, controller 225 directs the operation of channel controller 235, which comprises a number of channel elements, such as exemplary channel element 240, each of which performs bidirectional communication in the forward channel and the reverse channel. A forward channel (or downlink) refers to outbound signals from base station 102 to subscriber stations 111-116. A reverse channel (or uplink) refers to inbound signals from subscriber stations 111-116 to base station 102. Channel element 240 also preferably performs all baseband processing, including processing any digitized received signal to extract the information or data bits conveyed in the received signal, typically including demodulation, decoding, and error correction operations, as known to those of skill in the art. Transceiver IF 245 transfers bidirectional channel signals between channel controller 235 and RF transceiver unit 250.

Antenna array 255 transmits forward channel signals received from RF transceiver unit 250 to subscriber stations 111-116 in the coverage area of base station 102. Antenna array 255 is also operable to send to RF transceiver unit 250 reverse channel signals received from subscriber stations 111-116 in the coverage area of the base station 102. According to one embodiment of the present disclosure, antenna array 255 comprises a multi-sector antenna, such as a three-sector antenna in which each antenna sector is responsible for transmitting and receiving in a coverage area corresponding to an arc of approximately 120 degrees. Additionally, RF transceiver unit 250 may comprise an antenna selection unit to select among different antennas in antenna array 255 during both transmit and receive operations.

In accordance with an embodiment of the present disclosure, channel controller 235 also comprises a signal generator 265 that comprises a plurality of codebooks 270, a codebook selector 275, a precoder selector 280, a precoder 285 and an inverse fast Fourier transform (IFFT) block 290. Although illustrated and described as four separate components, it will be understood that any two or more of codebook selector 275, precoder selector 280, precoder 285 and IFFT block 290 may be implemented together in a single component without departing from the scope of the present disclosure.

Signal generator 265 is operable to create a virtual antenna for each signal by precoding the signals before transmission. Signal generator 265 is also operable to store a plurality of possible codebooks 270, each of which comprises a plurality of precoding matrices for use in precoding the signals. Codebook selector 275 is operable to select one of the codebooks 270 to be used for any suitable interval. For example, for one embodiment, codebook selector 275 is operable to select one of the codebooks 270 to be used once for each communication session with a subscriber station 111-116.

Precoder selector 280 is operable to select one of the precoding matrices from the selected codebook 270 for use in communicating with a subscriber station 111-116 for any suitable interval. For example, for one embodiment, precoder selector 280 is operable to select one of the precoding matrices from the selected codebook 270 for use in communicating with a subscriber station 111-116 for each transmission time interval (TTI).

Precoder 285 is operable to precode each signal, or data stream, for a corresponding virtual antenna using the precoding matrix selected by precoder selector 280. IFFT block 290 is operable to perform an inverse fast Fourier transform operation on each precoded signal. Each transformed, precoded signal may then be transmitted from a different antenna in antenna array 255.

Each precoding matrix of codebooks 270 that may be used by precoder 285 to precode the signals for transmission from base station 102 may comprise a composite precoding matrix, which is a precoding matrix that is generated based on a diversity precoding matrix and a power-sharing precoding matrix. As used herein, a "diversity precoding matrix" means a precoding matrix that is operable to provide transmit diversity. For example, for one embodiment, the diversity precoding matrix may comprise a unitary, cyclic delay diversity matrix. However, it will be understood that the diversity precoding matrix may comprise a non-unitary precoding matrix or other suitable type of unitary precoding matrix.

In addition, as used herein, a "power-sharing precoding matrix" means a precoding matrix that is operable to provide power-sharing properties for the physical antennas 255, such as those associated with spatial multiplexing in which each signal is transmitted in some form over each antenna 255. For example, for one embodiment, the power-sharing precoding matrix may comprise a unitary, Fourier-based precoding matrix. However, it will be understood that the power-sharing precoding matrix may comprise a non-unitary precoding matrix or a unitary, non-Fourier-based precoding matrix. As described in more detail below, each of the codebooks 270 may comprise composite precoding matrices that are generated based on a same set of power-sharing precoding matrices but that are also generated based on a diversity precoding matrix that has a different phase shift as compared to the other codebooks 270.

For one example, a power-sharing precoding matrix may comprise an N×N square, Fourier precoding matrix that is defined as follows:

$$P_{mn} = e^{j2\pi mn/N} \; m, n = 0, 1, \ldots (N-1).$$

Thus, a 2×2 Fourier precoding matrix may be expressed as:

$$P_2 = \frac{1}{\sqrt{2}} \begin{bmatrix} 1 & 1 \\ 1 & e^{j\pi} \end{bmatrix} = \frac{1}{\sqrt{2}} \begin{bmatrix} 1 & 1 \\ 1 & -1 \end{bmatrix}.$$

Similarly, a 4×4 Fourier precoding matrix may be expressed as:

$$P_4 = \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} = \frac{1}{\sqrt{4}} \begin{bmatrix} 1 & 1 & 1 & 1 \\ 1 & j & -1 & -j \\ 1 & -1 & 1 & -1 \\ 1 & -j & -1 & j \end{bmatrix}.$$

Multiple power-sharing precoding matrices that may be used in generating the composite precoding matrices for a particular codebook 270 may be defined by introducing a shift parameter (g/G) in the Fourier precoding matrix as given by:

$$P_{mn} = e^{j2\pi \frac{m}{N}\left(n + \frac{g}{G}\right)} m, n = 0, 1, \ldots (N-1).$$

For example, a set of four 2×2 Fourier precoding matrices may be defined by taking G=4. These four 2×2 matrices with g=0, 1, 2 and 3 are written as:

$$P_2^0 = \frac{1}{\sqrt{2}} \begin{bmatrix} 1 & 1 \\ 1 & -1 \end{bmatrix}$$

$$P_2^1 = \frac{1}{\sqrt{2}} \begin{bmatrix} 1 & 1 \\ e^{j\pi/4} & -e^{j\pi/4} \end{bmatrix}$$

$$P_2^2 = \frac{1}{\sqrt{2}} \begin{bmatrix} 1 & 1 \\ e^{j\pi/2} & e^{j3\pi/4} \end{bmatrix}$$

$$P_2^3 = \frac{1}{\sqrt{2}} \begin{bmatrix} 1 & 1 \\ e^{j3\pi/4} & -e^{j3\pi/4} \end{bmatrix}.$$

A cyclic delay diversity scheme may be implemented in the frequency domain with a phase shift of $e^{j\Phi_i k}$ applied to subcarrier k transmitted from the $i^{th}$ transmit antenna 255. The phase-shift angle may be defined as:

$$\varphi_i = \frac{2\pi}{N} D_i,$$

where $D_i$ is the cyclic delay in samples applied from the $i^{th}$ antenna 255. It will be understood that other functions may be used to derive the frequency domain phase shift. In addition, for some embodiments, the phase shift may be kept constant for a group of subcarriers and allowed to vary from one group of subcarriers to the next.

The cyclic delay diversity may be seen as precoding with the following diversity precoding matrix for the case of four transmit antennas 255:

$$D_4 = \frac{1}{\sqrt{4}} \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix}.$$

For this case, the same symbol with antenna- and frequency-dependent phase-shifts is transmitted from multiple antennas 255. Typically, no phase shift is applied for the symbol transmitted from the first antenna 255. As described above, different phase-shift angles may be used to generate multiple diversity precoding matrices, with each diversity precoding matrix corresponding to a particular codebook 270.

Also as described above, a power-sharing precoding matrix, P, and a diversity precoding matrix, D, may be used to generate a composite precoding matrix, C, for the case of four transmit antennas 255 as shown below:

$$C = D \times P$$

$$= \frac{1}{\sqrt{4}} \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix} \times \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix}$$

$$= \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix}$$

In another embodiment, the order of D and P matrix multiplication may be changed, resulting in a transpose of the composite precoding matrix, or $C^T$, as shown below:

$$C^T = P \times D$$

$$= \frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \times \begin{bmatrix} 1 & 0 & 0 & 0 \\ 0 & e^{j\phi_1 k} & 0 & 0 \\ 0 & 0 & e^{j\phi_2 k} & 0 \\ 0 & 0 & 0 & e^{j\phi_3 k} \end{bmatrix}$$

$$= \frac{1}{\sqrt{4}} \begin{bmatrix} 1 & e^{j\phi_1 k} & e^{j\phi_2 k} & e^{j\phi_3 k} \\ 1 & e^{j(\pi/2+\phi_1 k)} & e^{j(\pi+\phi_2 k)} & e^{j(3\pi/2+\phi_3 k)} \\ 1 & e^{j(\pi+\phi_1 k)} & e^{j(2\pi+\phi_2 k)} & e^{j(3\pi+\phi_3 k)} \\ 1 & e^{j(3\pi/2+\phi_1 k)} & e^{j(3\pi+\phi_2 k)} & e^{j(9\pi/2+\phi_3 k)} \end{bmatrix}$$

Since C represents a power-sharing precoding matrix (which transforms virtual antennas into physical antennas) and a diversity precoding matrix (which introduces cyclic time delay or an equivalent frequency shift), using C as a precoder results in delays for the physical antennas. On the other hand, using the transpose of this matrix, or $C^T$, results in delays for the virtual antennas. Thus, in order to introduce frequency selectivity, when the same symbol is input into precoder 285, the virtual antennas are delayed relative to each other.

In addition, when a single symbol is input into precoder 285, precoder 285 may be operable to multiply the symbol with a weight vector, w, that is not orthogonal to any row of the composite precoding matrix. For example, when w=[1 1 1 1]$^T$, w equals the first row of the composite precoding matrix and is therefore orthogonal to the other rows. Similarly, when different symbols are input into precoder 285, the physical antennas are delayed relative to each other because one symbol is transmitted on one virtual antenna.

For an example using two transmit antennas 255, a composite precoding matrix may be defined as follows:

$$C_2 = D_2 \times P_2 = \frac{1}{\sqrt{2}} \begin{bmatrix} 1 & 0 \\ 0 & e^{j\phi_1 k} \end{bmatrix} \times \begin{bmatrix} 1 & 1 \\ 1 & -1 \end{bmatrix} = \frac{1}{\sqrt{2}} \begin{bmatrix} 1 & 1 \\ e^{j\phi_1 k} & -e^{j\phi_1 k} \end{bmatrix}.$$

The symbols, $T_1$ and $T_2$, transmitted from the two physical antennas 255 are as follows:

$$\begin{bmatrix} T_1 \\ T_2 \end{bmatrix} = C_2^T \times \begin{bmatrix} S_1 \\ S_1 \end{bmatrix}$$

$$= \frac{1}{\sqrt{2}} \begin{bmatrix} 1 & e^{j\phi_1 k} \\ 1 & -e^{j\phi_1 k} \end{bmatrix} \times \begin{bmatrix} S_1 \\ S_1 \end{bmatrix}$$

$$= \frac{1}{\sqrt{2}} \begin{bmatrix} S_1(1+e^{j\phi_1 k}) \\ S_1(1-e^{j\phi_1 k}) \end{bmatrix}$$

$$= \frac{S_1 e^{j\frac{\varphi_1 k}{2}}}{\sqrt{2}} \begin{bmatrix} \cos(\varphi_1 k/2) \\ e^{j3\pi/2}\cos(\varphi_1 k/2 + \pi/2) \end{bmatrix}$$

The composite precoding matrices may be developed for other transmit diversity schemes, such as space-frequency block-code (SFBC), frequency-switched transmit diversity (FSTD), time-switched transmit diversity (TSTD) or a combination of these schemes. For example, for the case of SFBC for two transmit antennas 255, the symbols transmitted from the two antennas 255 and two adjacent subcarriers may be given as:

$$\begin{bmatrix} T_{11} & T_{12} \\ T_{21} & T_{22} \end{bmatrix} = \frac{1}{\sqrt{2}} \begin{bmatrix} 1 & 1 \\ 1 & -1 \end{bmatrix} \times \begin{bmatrix} S_1 & -S_2^* \\ S_2 & S_1^* \end{bmatrix}$$

$$= \frac{1}{\sqrt{2}} \begin{bmatrix} S_1 + S_2 & -S_2^* + S_1^* \\ S_1 - S_2 & -S_2^* - S_1^* \end{bmatrix},$$

where $T_{11}$ and $T_{21}$ denote the symbols transmitted from antenna 1 and antenna 2 on the first OFDM subcarrier and $T_{12}$ and $T_{22}$ denote the symbols transmitted from antenna 1 and antenna 2 on the second OFDM subcarrier.

For another example, for the case of FSTD for two transmit antennas 255, the symbols transmitted from the two antennas 255 and two adjacent subcarriers may be given as:

$$\begin{bmatrix} T_{11} & T_{12} \\ T_{21} & T_{22} \end{bmatrix} = \frac{1}{\sqrt{2}} \begin{bmatrix} 1 & 1 \\ 1 & -1 \end{bmatrix} \times \begin{bmatrix} S_1 & 0 \\ 0 & S_2 \end{bmatrix}$$

$$= \frac{1}{\sqrt{2}} \begin{bmatrix} S_1 & S_2 \\ S_1 & -S_2 \end{bmatrix},$$

where $T_{11}$ and $T_{21}$ denote the symbols transmitted from antenna 1 and antenna 2 on the first subcarrier and $T_{12}$ and $T_{22}$ denote the symbols transmitted from antenna 1 and antenna 2 on the second subcarrier.

For another example, for the case of FSTD transmission for four transmit antennas 255, the symbols transmitted from the four transmit antennas 255 on four subcarriers may be given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} =$$

$$\frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \times \begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix}$$

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & S_2 & S_3 & S_4 \\ S_1 & S_2 \cdot e^{j(\pi/2)} & S_3 \cdot e^{j(\pi)} & S_3 \cdot e^{j(3\pi/2)} \\ S_1 & S_2 \cdot e^{j(\pi)} & S_3 \cdot e^{j(2\pi)} & S_4 \cdot e^{j(3\pi)} \\ S_1 & S_2 \cdot e^{j(3\pi/2)} & S_3 \cdot e^{j(3\pi)} & S_4 \cdot e^{j(9\pi/2)} \end{bmatrix}$$

If we make the assumption that $\phi_2 = 2\phi_1$ and $\phi_3 = 3\phi_1$, then the expression above may be simplified as follows:

$$\begin{bmatrix} T_1 \\ T_2 \\ T_3 \\ T_4 \end{bmatrix} = C^T \times S$$

$$= S_1 e^{j(2\phi_1 k/2)} \begin{bmatrix} \cos(\varphi_1 k/2)\cos(\varphi_1 k) \\ e^{j(3\pi/4)}\cos(\varphi_1 k/2 + \pi/4)\cos(\varphi_1 k + \pi/2) \\ e^{j(3\pi/2)}\cos(\varphi_1 k/2 + \pi/2)\cos(\varphi_1 k + \pi) \\ e^{j(9\pi/4)}\cos(\varphi_1 k/2 + 3\pi/4)\cos(\varphi_1 k + 3\pi/2) \end{bmatrix}.$$

Thus, as shown above with the two-antenna and four-antenna cases, using a composite precoding matrix results in a scheme that amplitude-modulates the different antennas 255 with orthogonal signals.

For another embodiment, a combination of SFBC and FSTD may be employed for the case of four transmit antennas 255, as follows:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}}$$

$$\begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \times$$

$$\begin{bmatrix} S_1 & -S_2^* & 0 & 0 \\ S_2 & S_1^* & 0 & 0 \\ 0 & 0 & S_3 & -S_4^* \\ 0 & 0 & S_4 & S_3^* \end{bmatrix}$$

$$= \frac{1}{\sqrt{4}}$$

$$\begin{bmatrix} S_1 + S_2 & -S_2^* + S_1^* & S_3 + S_4 & -S_4^* + S_3^* \\ S_1 + S_2 \cdot e^{j(\pi/2)} & -S_2^* + S_1^* \cdot e^{j(\pi/2)} & S_3 \cdot e^{j(\pi)} + S_4 \cdot e^{j(3\pi/2)} & -S_4^* \cdot e^{j(\pi)} + S_3^* \cdot e^{j(3\pi/2)} \\ S_1 + S_2 \cdot e^{j(\pi)} & -S_2^* + S_1^* \cdot e^{j(\pi)} & S_3 \cdot e^{j(2\pi)} + S_4 \cdot e^{j(3\pi)} & -S_4^* \cdot e^{j(2\pi)} + S_3^* \cdot e^{j(3\pi)} \\ S_1 + S_2 \cdot e^{j(3\pi/2)} & -S_2^* + S_1^* \cdot e^{j(3\pi/2)} & S_3 \cdot e^{j(3\pi)} + S_4 \cdot e^{j9\pi/2} & -S_4^* \cdot e^{j(3\pi)} + S_3^* \cdot e^{j9\pi/2} \end{bmatrix}$$

where $T_{ij}$ represents a symbol transmitted on the $i^{th}$ antenna and the $j^{th}$ subcarrier (i=1, 2, 3, 4 and j=1, 2, 3, 4) for the case of four transmit antennas 255.

In addition, it will be understood that SFBC may be combined with cyclic delay diversity (CDD) or phase-shift diversity for the case of four transmit antennas as follows:

$$\begin{bmatrix} T_{11} & T_{12} \\ T_{21} & T_{22} \\ T_{31} & T_{32} \\ T_{41} & T_{42} \end{bmatrix} = C^T \times S$$

$$= \frac{1}{\sqrt{4}}$$

$$\begin{bmatrix} 1 & e^{j\phi_1 k} & e^{j\phi_2 k} & e^{j\phi_3 k} \\ 1 & e^{j(\pi/2+\phi_1 k)} & e^{j(\pi+\phi_2 k)} & e^{j(3\pi/2+\phi_3 k)} \\ 1 & e^{j(\pi+\phi_1 k)} & e^{j(2\pi+\phi_2 k)} & e^{j(3\pi+\phi_3 k)} \\ 1 & e^{j(3\pi/2+\phi_1 k)} & e^{j(3\pi+\phi_2 k)} & e^{j(9\pi/2+\phi_3 k)} \end{bmatrix} \times$$

$$\begin{bmatrix} S_1 & -S_2^* \\ S_2 & S_1^* \\ S_1 & -S_2^* \\ S_2 & S_1^* \end{bmatrix}$$

where $T_{ij}$ represents a symbol transmitted on the $i^{th}$ antenna and the $j^{th}$ subcarrier (i=1, 2, 3, 4 and j=1, 2) for the case of four transmit antennas 255 for the hybrid SFBC and CDD schemes.

For the case of TSTD, the four symbols transmitted in four time slots from the four transmit antennas 255 on the same subcarrier may be given as:

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} =$$

$$\frac{1}{\sqrt{4}} \begin{bmatrix} 1 & 1 & 1 & 1 \\ 1 & e^{j\pi/2} & e^{j\pi} & e^{j3\pi/2} \\ 1 & e^{j\pi} & e^{j2\pi} & e^{j3\pi} \\ 1 & e^{j3\pi/2} & e^{j3\pi} & e^{j9\pi/2} \end{bmatrix} \times \begin{bmatrix} S_1 & 0 & 0 & 0 \\ 0 & S_2 & 0 & 0 \\ 0 & 0 & S_3 & 0 \\ 0 & 0 & 0 & S_4 \end{bmatrix}$$

$$\begin{bmatrix} T_{11} & T_{12} & T_{13} & T_{14} \\ T_{21} & T_{22} & T_{23} & T_{24} \\ T_{31} & T_{32} & T_{33} & T_{34} \\ T_{41} & T_{42} & T_{43} & T_{44} \end{bmatrix} = \frac{1}{\sqrt{4}} \begin{bmatrix} S_1 & S_2 & S_3 & S_4 \\ S_1 & S_2 \cdot e^{j(\pi/2)} & S_3 \cdot e^{j(\pi)} & S_3 \cdot e^{j(3\pi/2)} \\ S_1 & S_2 \cdot e^{j(\pi)} & S_3 \cdot e^{j(2\pi)} & S_4 \cdot e^{j(3\pi)} \\ S_1 & S_2 \cdot e^{j(3\pi/2)} & S_3 \cdot e^{j(3\pi)} & S_4 \cdot e^{j(9\pi/2)} \end{bmatrix}$$

where $T_{ij}$ represents a symbol transmitted on the $i^{th}$ antenna and the $j^{th}$ time-slot or OFDM symbol (i=1, 2, 3, 4 and j=1, 2, 3, 4) for the case of four transmit antennas 255.

In one embodiment of the present disclosure, as described above, a plurality of codebooks 270 is stored in signal generator 265. For one embodiment, the composite precoding matrices for each codebook 270 may be based on a different diversity precoding matrix. For example, a first codebook, CB1, may be based on a power-sharing precoding matrix without any diversity precoding. This is equivalent to the phase shifts in the diversity precoding matrix being all zeros (i.e., the diversity precoding matrix is a diagonal matrix with 1s on the diagonal and all other elements set to zeros). A shift parameter may then be used to generate a plurality of precoding matrices based on a single power-sharing precoding matrix. An example of this codebook 270 with four precoding matrices for the case of two transmit antennas 255 may be given as follows:

$$CB1 = \begin{bmatrix} P_2^0 & P_2^1 & P_2^2 & P_2^3 \end{bmatrix}$$

$$= \frac{1}{\sqrt{2}}$$

$$\left\{ \begin{bmatrix} 1 & 1 \\ 1 & -1 \end{bmatrix} \begin{bmatrix} 1 & 1 \\ e^{j\pi/4} & -e^{j\pi/4} \end{bmatrix} \begin{bmatrix} 1 & 1 \\ e^{j\pi/2} & e^{j3\pi/4} \end{bmatrix} \begin{bmatrix} 1 & 1 \\ e^{j3\pi/4} & -e^{j3\pi/4} \end{bmatrix} \right\}$$

Another codebook, CB2, may be obtained by adding diversity precoding into the composite precoding matrices. A set of composite precoding matrices for this codebook 270 may be obtained as follows:

$$C_2^i = D_2 \times P_2^i = \frac{1}{\sqrt{2}} \begin{bmatrix} 1 & 0 \\ 0 & e^{j\phi_1 k} \end{bmatrix} \times P_2^i.$$

The codebook, CB2, comprising multiple composite precoding matrices may then be given as follows:

$$CB2 = \begin{bmatrix} C_2^0 & C_2^1 & C_2^2 & C_2^3 \end{bmatrix}$$

$$= \frac{1}{\sqrt{2}}$$

$$\left\{ \begin{bmatrix} 1 & 1 \\ e^{j\phi_1 k} & -e^{j\phi_1 k} \end{bmatrix} \begin{bmatrix} 1 & 1 \\ e^{j(\pi/4+\phi_1 k)} & -e^{j(\pi/4+\phi_1 k)} \end{bmatrix} \begin{bmatrix} 1 & 1 \\ e^{j(\pi/2+\phi_1 k)} & e^{j(3\pi/4+\phi_1 k)} \end{bmatrix} \begin{bmatrix} 1 & 1 \\ e^{j(3\pi/4+\phi_1 k)} & -e^{j(3\pi/4+\phi_1 k)} \end{bmatrix} \right\}$$

Similarly, other codebooks 270 may be obtained by using different phase shifts in the diversity precoding matrix, D. For example, for a particular embodiment, a first codebook 270 may be provided with no delay, such as the codebook, CB1, described above, a second codebook 270 may be provided with a relatively small delay, and a third codebook 270 may be provided with a relatively large delay.

For this particular example, codebook selector 275 may select the second codebook 270 that uses a smaller value for ϕ in the diversity precoding matrix for a low-mobility user requiring frequency-selective multi-user scheduling. A smaller ϕ will result in a smaller phase shift from one subcarrier to the next for transmission from multiple antennas 255 providing upfades and downfades on a group of subcarriers suitable for frequency-selective multi-user scheduling. It is also possible to select a constant phase shift over a group of subcarriers. A low-mobility user may also dynamically select a composite precoding matrix from the second codebook 270 that results in maximum signal quality because the dynamic selection of a composite precoding matrix is fairly reliable at low speeds.

In addition, for this particular example, codebook selector 275 may select the third codebook 270 that uses a larger value for ϕ in the diversity precoding matrix for a high-mobility user requiring transmit diversity. A larger ϕ will result in a larger phase shift from one subcarrier to the next for transmission from multiple antennas 255 providing frequency diversity. A high-mobility user may also select a fixed composite precoding matrix from the third codebook 270 because the dynamic selection of a composite precoding matrix may not be beneficial due to precoder selection indication feedback delays.

Figure 3:
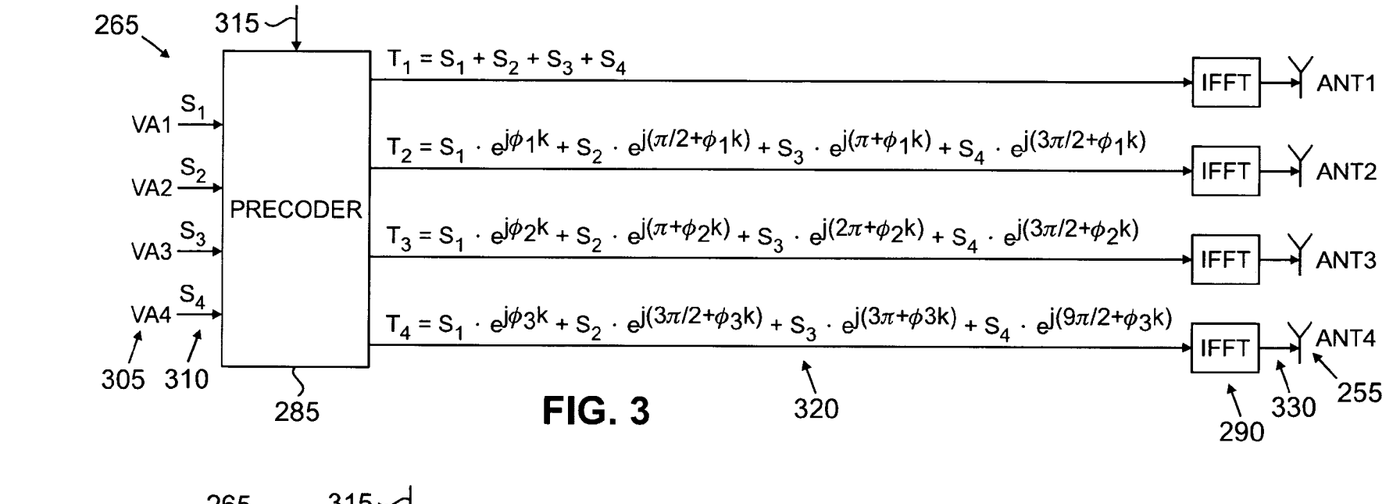
FIG. 3 illustrates details of a portion of the signal generator of FIG. 2 when using full spatial multiplexing according to an embodiment of the present disclosure.

FIG. 3 illustrates details of a portion of signal generator 265 when using full spatial multiplexing according to an embodiment of the present disclosure. As used herein, "full spatial multiplexing" refers to the situation in which signal generator 265 is generating signals based on a specified number of data streams that is equal to the number of transmit antennas in antenna array 255.

For the illustrated embodiment, signal generator 265 comprises a precoder 285 that is operable to receive four data streams 310 ($S_1$, $S_2$, $S_3$ and $S_4$) from four virtual antennas 305 (VA1, VA2, VA3 and VA4). In addition, antenna array 255 comprises four antennas. However, it will be understood that signal generator 265 may comprise any other suitable number of virtual antennas 305, which are each operable to provide a data stream 310, based on the number of antennas in antenna array 255.

Precoder 285 is operable to receive a composite precoding matrix 315 from precoder selector 280. Precoder 285 is operable to apply the composite precoding matrix 315 to each of the data streams 310 received from a created virtual antenna 305 in order to generate four precoded signals 320 ($T_1$, $T_2$, $T_3$ and $T_4$). IFFT block 290 is operable to perform an inverse fast Fourier transform on each of the precoded signals 320 to generate a transformed, precoded signal 330 for transmission over a corresponding physical antenna in antenna array 255.

For one example of the case of spatial multiplexing of four data streams in a 4×4 system, the symbol column matrix, S, is multiplied with the composite precoding matrix, C, to give a column vector, T, of symbols to be transmitted from the physical antennas 255, as follows:

$$\begin{bmatrix} T_1 \\ T_2 \\ T_3 \\ T_4 \end{bmatrix} = C \times S = \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ S_2 \\ S_3 \\ S_4 \end{bmatrix}$$

$$\begin{bmatrix} T_1 \\ T_2 \\ T_3 \\ T_4 \end{bmatrix} = \frac{1}{\sqrt{4}} \begin{bmatrix} S_1 + S_2 + S_3 + S_4 \\ S_1 \cdot e^{j\phi_1 k} + S_2 \cdot e^{j(\pi+\phi_1 k)} + S_3 \cdot e^{j(\pi+\phi_1 k)} + S_4 \cdot e^{j(3\pi/2+\phi_1 k)} \\ S_1 \cdot e^{j\phi_2 k} + S_2 \cdot e^{j(\pi+\phi_2 k)} + S_3 \cdot e^{j(2\pi+\phi_2 k)} + S_4 \cdot e^{j(3\pi+\phi_2 k)} \\ S_1 \cdot e^{j\phi_3 k} + S_2 \cdot e^{j(3\pi/2+\phi_3 k)} + S_3 \cdot e^{j(3\pi+\phi_3 k)} + S_4 \cdot e^{j(9\pi/2+\phi_3 k)} \end{bmatrix}$$

Figure 4:
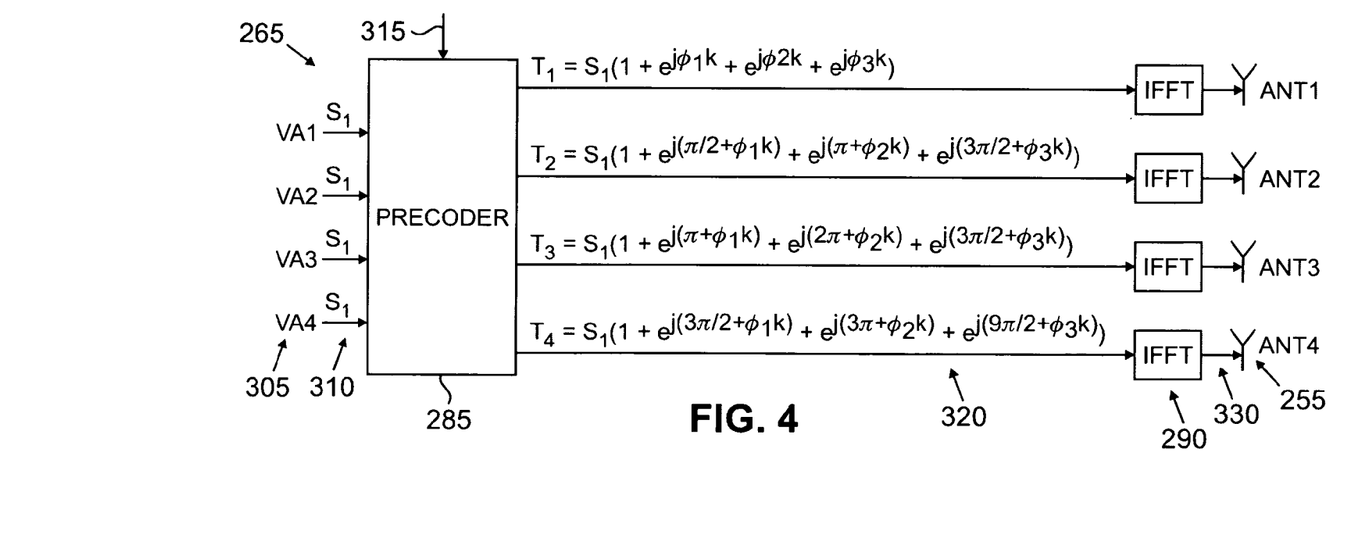
FIG. 4 illustrates details of a portion of the signal generator of FIG. 2 when using transmit diversity according to an embodiment of the present disclosure.

FIG. 4 illustrates details of a portion of signal generator 265 when using transmit diversity according to an embodiment of the present disclosure. For one example of transmit diversity transmission for the case of four transmit antennas 255 and any number of receive antennas, the symbol column matrix, S, comprising the same symbol is multiplied with the transpose of the composite precoding matrix, C, to give a column vector, T, of symbols transmitted from the four physical antennas 255, as follows:

$$\begin{bmatrix} T_1 \\ T_2 \\ T_3 \\ T_4 \end{bmatrix} = C^T \times S = \frac{1}{\sqrt{4}} \begin{bmatrix} 1 & e^{j\phi_1 k} & e^{j\phi_2 k} & e^{j\phi_3 k} \\ 1 & e^{j(\pi/2+\phi_1 k)} & e^{j(\pi+\phi_2 k)} & e^{j(3\pi/2+\phi_3 k)} \\ 1 & e^{j(\pi+\phi_1 k)} & e^{j(2\pi+\phi_2 k)} & e^{j(3\pi+\phi_3 k)} \\ 1 & e^{j(3\pi/2+\phi_1 k)} & e^{j(3\pi+\phi_2 k)} & e^{j(9\pi/2+\phi_3 k)} \end{bmatrix} \times \begin{bmatrix} S_1 \\ S_1 \\ S_1 \\ S_1 \end{bmatrix}$$

$$\begin{bmatrix} T_1 \\ T_2 \\ T_3 \\ T_4 \end{bmatrix} = \frac{1}{\sqrt{4}} \begin{bmatrix} S_1(1 + e^{j\phi_1 k} + e^{j\phi_2 k} + e^{j\phi_3 k}) \\ S_1(1 + e^{j(\pi/2+\phi_1 k)} + e^{j(\pi+\phi_2 k)} + e^{j(3\pi/2+\phi_3 k)}) \\ S_1(1 + e^{j(\pi+\phi_1 k)} + e^{j(2\pi+\phi_2 k)} + e^{j(3\pi+\phi_3 k)}) \\ S_1(1 + e^{j(3\pi/2+\phi_1 k)} + e^{j(3\pi+\phi_2 k)} + e^{j(9\pi/2+\phi_3 k)}) \end{bmatrix}$$

FIGS. 5A-D illustrate details of a portion of signal generator 265 when using partial spatial multiplexing according to some embodiments of the present disclosure. As used herein, "partial spatial multiplexing" refers to the situation in which signal generator 265 is generating signals based on a specified number of data streams that is greater than one but less than the number of transmit antennas in antenna array 255. It will be understood that the embodiments illustrated in FIGS. 5A-D are examples for explanatory purposes and that other suitable embodiments may be implemented.

Figure 5A:
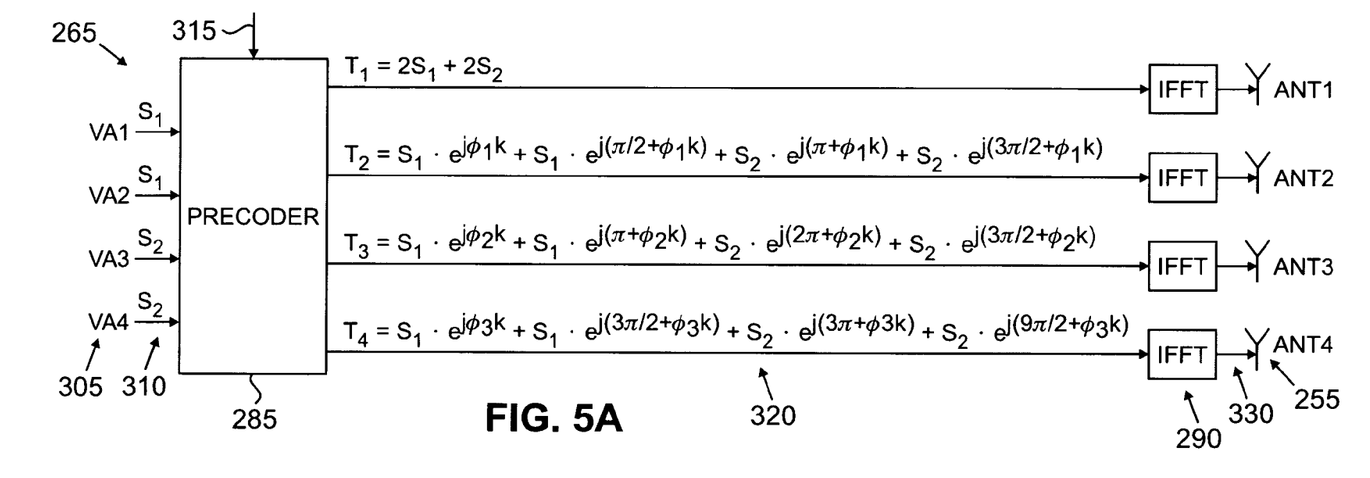
FIGS. 5A-D illustrate details of a portion of the signal generator of FIG. 2 when using partial spatial multiplexing according to some embodiments of the present disclosure.

As shown in FIG. 5A, for the case of spatial multiplexing of two data 310 streams, for example, in a 4×4 or 4×2 system, the symbol column vector, S, may be generated by repeating the two stream symbols $S_1$ and $S_2$ as below.

$$S^T = [S_1\ S_1\ S_2\ S_2].$$

The symbol vector is then multiplied with the composite precoding matrix, C, to give a column vector, T, of symbols to be transmitted from the physical antennas 255, as follows:

$$\begin{bmatrix} T_1 \\ T_2 \\ T_3 \\ T_4 \end{bmatrix} = C \times S = \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ S_1 \\ S_2 \\ S_2 \end{bmatrix}$$

$$\begin{bmatrix} T_1 \\ T_2 \\ T_3 \\ T_4 \end{bmatrix} = \frac{1}{\sqrt{4}} \begin{bmatrix} 2S_1 + 2S_2 \\ S_1 \cdot e^{j\phi_1 k} + S_1 \cdot e^{j(\pi/2+\phi_1 k)} + S_2 \cdot e^{j(\pi+\phi_1 k)} + S_2 \cdot e^{j(3\pi/2+\phi_1 k)} \\ S_1 \cdot e^{j\phi_2 k} + S_1 \cdot e^{j(\pi+\phi_2 k)} + S_2 \cdot e^{j(2\pi+\phi_2 k)} + S_2 \cdot e^{j(3\pi+\phi_2 k)} \\ S_1 \cdot e^{j\phi_3 k} + S_1 \cdot e^{j(3\pi/2+\phi_3 k)} + S_2 \cdot e^{j(3\pi+\phi_3 k)} + S_2 \cdot e^{j(9\pi/2+\phi_3 k)} \end{bmatrix}$$

Figure 5B:
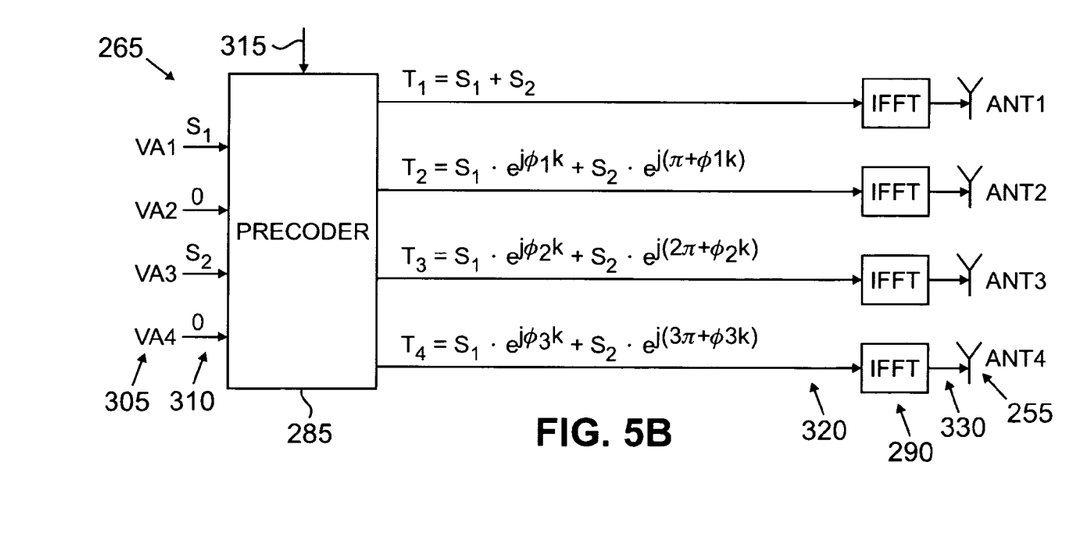

As shown in FIG. 5B, for the case of spatial multiplexing of two data streams 310, for example, in a 4×4 or 4×2 system, the information is transmitted over two virtual antennas 305. The virtual antennas 305 may be selected based on the virtual antenna channel quality information. For example, when the two data streams 310 are transmitted over the first and third virtual antennas 305, the symbol vector may be written as follows:

$$S^T = [S_1\ 0\ S_2\ 0].$$

The symbol vector is then multiplied with the 4×4 composite precoding matrix, C, to generate a column vector, T, of symbols to be transmitted from the physical antennas 255, as follows:

$$\begin{bmatrix} T_1 \\ T_2 \\ T_3 \\ T_4 \end{bmatrix} = \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ 0 \\ S_2 \\ 0 \end{bmatrix}$$

$$\begin{bmatrix} T_1 \\ T_2 \\ T_3 \\ T_4 \end{bmatrix} = \frac{1}{\sqrt{4}} \begin{bmatrix} S_1 + S_2 \\ S_1 \cdot e^{j\phi_1 k} + S_2 \cdot e^{j(\pi+\phi_1 k)} \\ S_1 \cdot e^{j\phi_2 k} + S_2 \cdot e^{j(2\pi+\phi_2 k)} \\ S_1 \cdot e^{j\phi_3 k} + S_2 \cdot e^{j(3\pi+\phi_3 k)} \end{bmatrix}$$

Figure 5C:
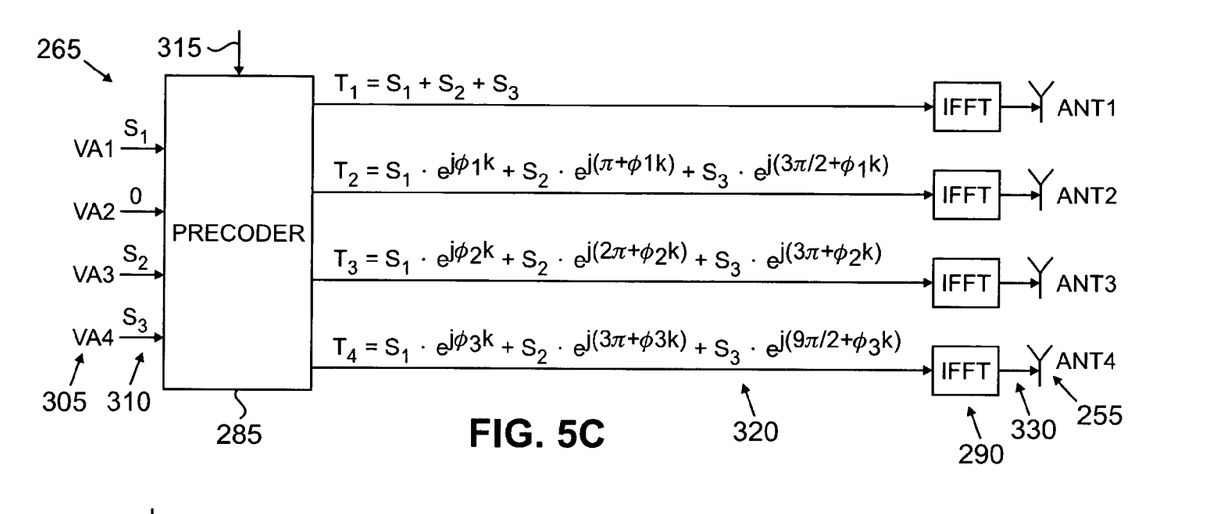

As shown in FIG. 5C, for the case of spatial multiplexing of three data streams 310, for example, in a 4×4 or 4×3 system, the information is transmitted over three virtual antennas 305. The virtual antennas 305 may be selected based on the virtual antenna channel quality information. For example, when the three data streams 310 are transmitted over the first, third and fourth virtual antennas 305, the symbol vector may be written as follows:

$$S_T = [S_1 \ 0 \ S_2 \ S_3].$$

The symbol vector is then multiplied with the 4×4 composite precoding matrix, C, to generate a column vector, T, of symbols to be transmitted from the physical antennas 255, as follows:

$$\begin{bmatrix} T_1 \\ T_2 \\ T_3 \\ T_4 \end{bmatrix} = \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ 0 \\ S_2 \\ S_3 \end{bmatrix}$$

$$\begin{bmatrix} T_1 \\ T_2 \\ T_3 \\ T_4 \end{bmatrix} = \frac{1}{\sqrt{4}} \begin{bmatrix} S_1 + S_2 + S_3 \\ S_1 \cdot e^{j\phi_1 k} + S_2 \cdot e^{j(\pi+\phi_1 k)} + S_3 \cdot e^{j(3\pi/2+\phi_1 k)} \\ S_1 \cdot e^{j\phi_2 k} + S_2 \cdot e^{j(2\pi+\phi_2 k)} + S_3 \cdot e^{j(3\pi+\phi_2 k)} \\ S_1 \cdot e^{j\phi_3 k} + S_2 \cdot e^{j(3\pi+\phi_3 k)} + S_3 \cdot e^{j(9\pi/2+\phi_3 k)} \end{bmatrix}$$

Figure 5D:
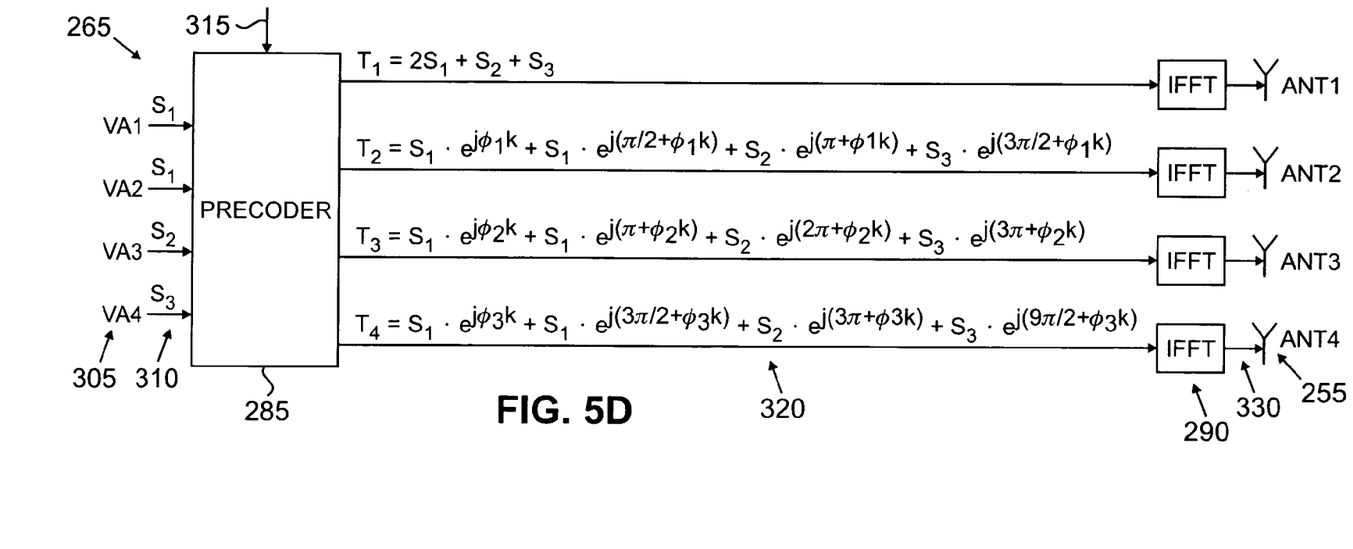

As shown in FIG. 5D, three data streams 310 may be transmitted over four virtual antennas 305. The symbol column vector, S, is generated by repeating the first stream symbols and not repeating the second and third stream symbols, as follows:

$$S^T = [S_1 \ S_1 \ S_2 \ S_3]$$

In this arrangement, the first data stream 310 also benefits from additional transmit diversity. The symbol vector is then multiplied with the composite precoding matrix, C, to give a column vector, T, of symbols to be transmitted from the physical antennas 255, as follows:

$$\begin{bmatrix} T_1 \\ T_2 \\ T_3 \\ T_4 \end{bmatrix} = C \times S = \frac{1}{\sqrt{4}} \begin{bmatrix} 1 & 1 & 1 & 1 \\ e^{j\phi_1 k} & e^{j(\pi/2+\phi_1 k)} & e^{j(\pi+\phi_1 k)} & e^{j(3\pi/2+\phi_1 k)} \\ e^{j\phi_2 k} & e^{j(\pi+\phi_2 k)} & e^{j(2\pi+\phi_2 k)} & e^{j(3\pi+\phi_2 k)} \\ e^{j\phi_3 k} & e^{j(3\pi/2+\phi_3 k)} & e^{j(3\pi+\phi_3 k)} & e^{j(9\pi/2+\phi_3 k)} \end{bmatrix} \times \begin{bmatrix} S_1 \\ S_1 \\ S_2 \\ S_3 \end{bmatrix}$$

$$\begin{bmatrix} T_1 \\ T_2 \\ T_3 \\ T_4 \end{bmatrix} = \frac{1}{\sqrt{4}} \begin{bmatrix} 2S_1 + S_2 + S_3 \\ S_1 \cdot e^{j\phi_1 k} + S_1 \cdot e^{j(\pi/2+\phi_1 k)} + S_2 \cdot e^{j(\pi+\phi_1 k)} + S_3 \cdot e^{j(3\pi/2+\phi_1 k)} \\ S_1 \cdot e^{j\phi_2 k} + S_1 \cdot e^{j(\pi+\phi_2 k)} + S_2 \cdot e^{j(2\pi+\phi_2 k)} + S_3 \cdot e^{j(3\pi+\phi_2 k)} \\ S_1 \cdot e^{j\phi_3 k} + S_1 \cdot e^{j(3\pi/2+\phi_3 k)} + S_2 \cdot e^{j(3\pi+\phi_3 k)} + S_3 \cdot e^{j(9\pi/2+\phi_3 k)} \end{bmatrix}$$

Figure 6A:
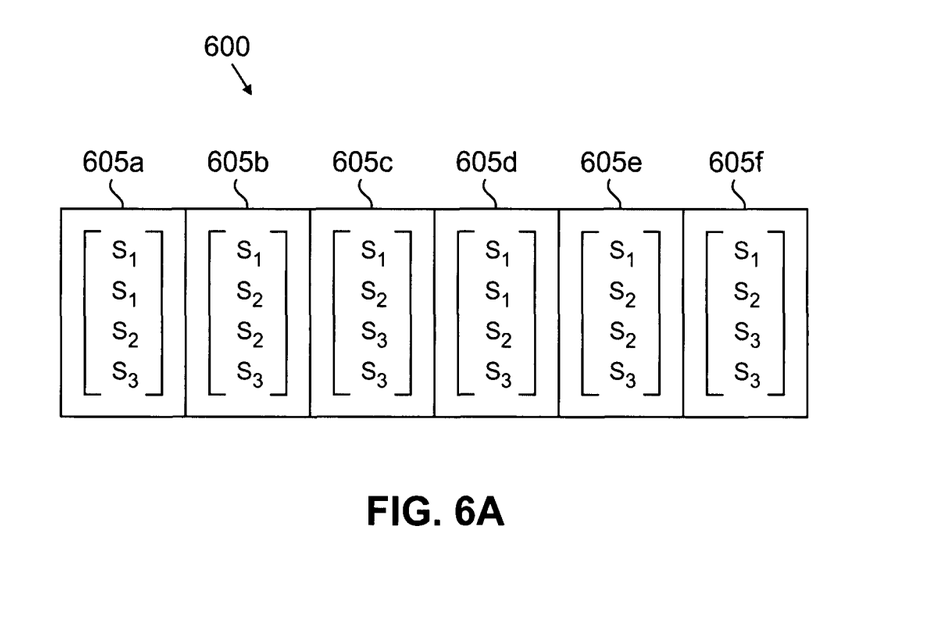
FIGS. 6A-B illustrate symbol vector precoding structures for use by the signal generator of FIG. 2 when using partial spatial multiplexing according to two embodiments of the present disclosure.
Figure 6B:
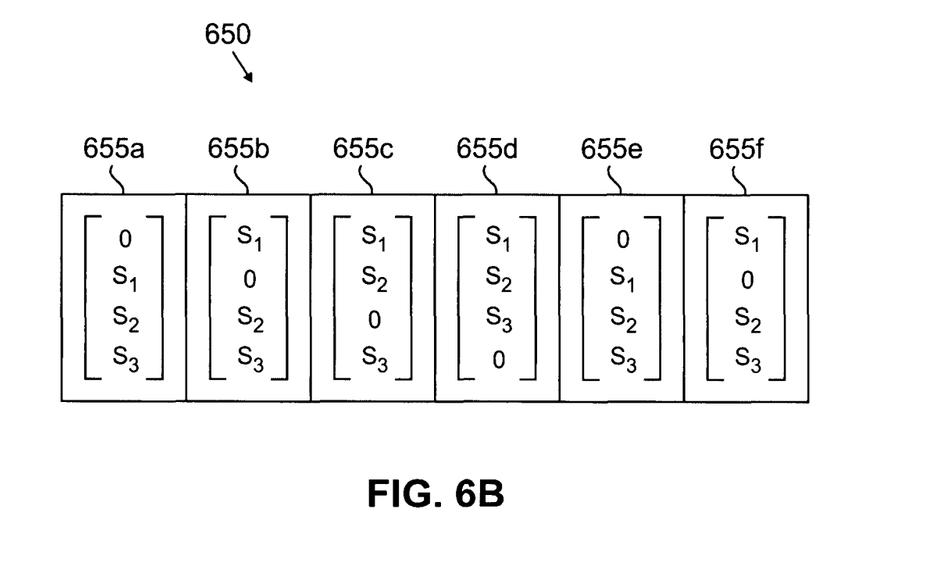

FIGS. 6A-B illustrate symbol vector precoding structures 600, 650 for use by signal generator 265 when using partial spatial multiplexing according to two embodiments of the present disclosure.

For the embodiment shown in FIG. 6A, the symbol vector precoding structure 600 may correspond to a transmission time interval (TTI) or a frequency resource block. The illustrated embodiment includes six OFDM symbols 605a-f; however, it will be understood that each TTI or frequency resource block may comprise any suitable number of OFDM symbols 605.

For the embodiment in which the symbol vector precoding structure 600 corresponds to a TTI, the OFDM symbols 605 mapped to virtual antennas 305 are hopped through during the TTI as shown. Similarly, for the embodiment in which the symbol vector precoding structure 600 corresponds to a frequency resource block, the OFDM symbols 605 mapped to virtual antennas 305 are hopped through from subcarrier to subcarrier over the frequency resource block allocated for transmission.

In the illustrated embodiment, the symbol for stream 1 ($S_1$) is repeated in the first and fourth OFDM symbols 605a and 605d, the symbol for stream 2 ($S_2$) is repeated in the second and fifth OFDM symbols 605b and 605e, and the symbol for stream 3 ($S_3$) is repeated in the third and sixth OFDM symbols 605c and 605f. Therefore, each of the streams is allowed to experience additional transmit diversity while spatial multiplexing is also provided.

For the embodiment shown in FIG. 6B, the symbol vector precoding structure 650 may correspond to a TTI or a frequency resource block. The illustrated embodiment includes six OFDM symbols 655a-f; however, it will be understood that each TTI or frequency resource block may comprise any suitable number of OFDM symbols 655.

In the illustrated embodiment, three data streams 310 are transmitted on three virtual antennas 305. For the embodiment in which the symbol vector precoding structure 650 corresponds to a TTI, the virtual antennas 305 used for transmission change from OFDM symbol 655 to OFDM symbol 655. Similarly, for the embodiment in which the symbol vector precoding structure 650 corresponds to a frequency resource block, the virtual antennas 305 used for transmission change from OFDM subcarrier to subcarrier.

For the illustrated example, virtual antennas 2, 3 and 4 are used for stream 1 ($S_1$), stream 2 ($S_2$) and stream 3 ($S_3$), respectively, in the first and fifth OFDM symbols 655a and 655e. In the second and sixth OFDM symbols 655b and 655f, virtual antennas 1, 3 and 4 are used for stream 1, stream 2 and stream 3, respectively. In the third OFDM symbol 655c, virtual antennas 1, 2 and 4 are used for stream 1, stream 2 and stream 3, respectively. In the fourth OFDM symbol 655d, virtual antennas 1, 2 and 3 are used for stream 1, stream 2 and stream 3, respectively.

Figure 7:
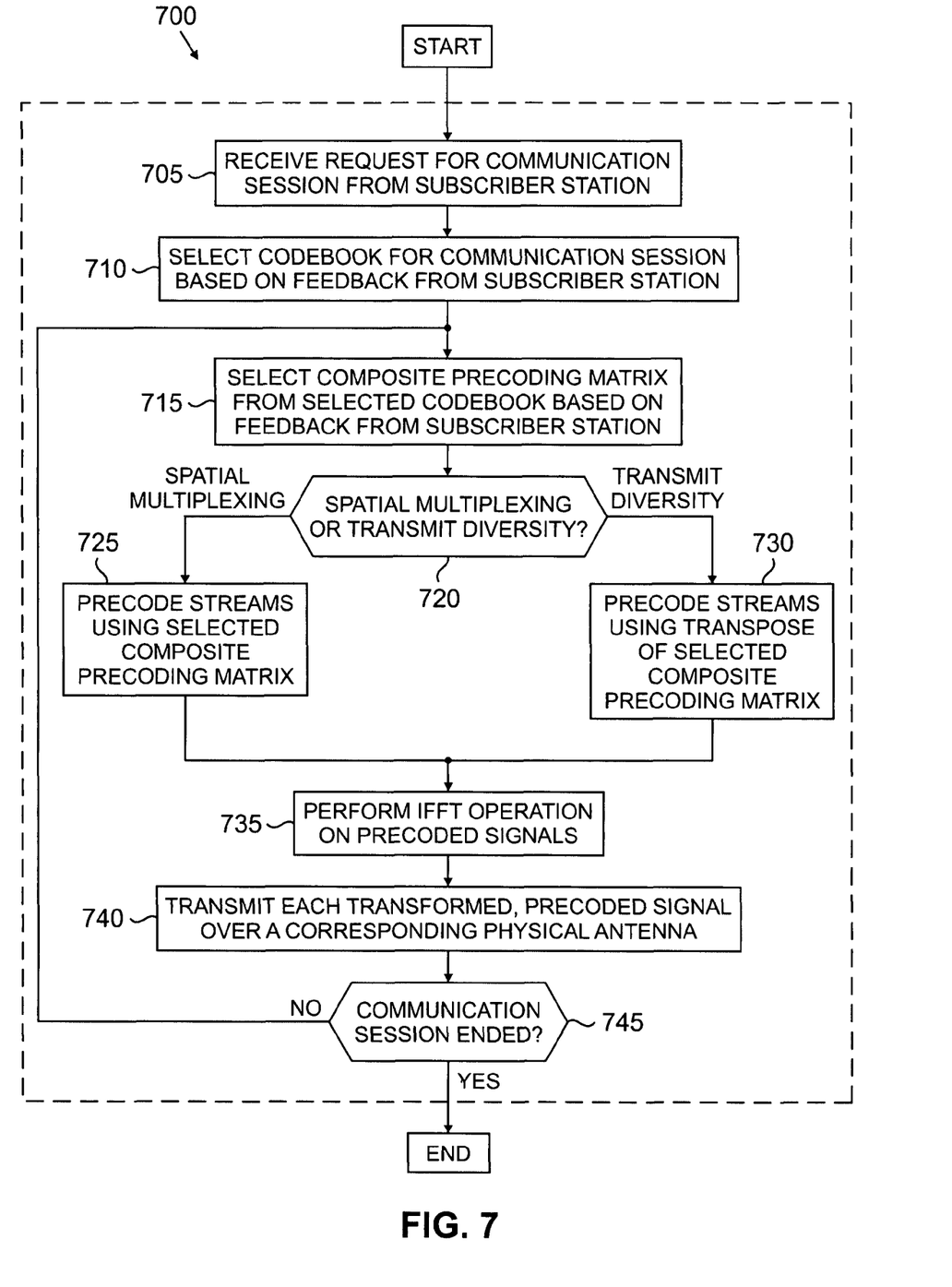
FIG. 7 is a flow diagram illustrating a method for performing precoding using the signal generator of FIG. 2 according to an embodiment of the present disclosure.

FIG. 7 is a flow diagram illustrating a method 700 for performing precoding using signal generator 265 according to an embodiment of the present disclosure. Initially, base station 102 receives a request for a communication session from a subscriber station, such as subscriber station 111 (process step 705).

Codebook selector 275 selects a codebook 270 for the communication session based on feedback received from subscriber station 111 (process step 710). Precoder selector 280 then selects a composite precoding matrix 315 from the selected codebook 270 based on feedback from subscriber station 111 (process step 715).

If spatial multiplexing is being used by base station 102 (process step 720), precoder 285 precodes each data stream 310 received from a virtual antenna 305 by applying the selected composite precoding matrix 315 to generate precoded signals 320 (process step 725). However, if transmit diversity is being used by base station 102 (process step 720), precoder 285 precodes each data stream 310 received from a virtual antenna 305 by applying the transpose of the selected composite precoding matrix 315 to generate precoded signals 320 (process step 730).

IFFT block 290 performs an IFFT operation on the precoded signals 320 to generate a transformed, precoded signal 330 for each precoded signal 320 (process step 735). Each transformed, precoded signal 330 is transmitted over a corresponding physical antenna in antenna array 255 (process step 740).

If the communication session has not ended (process step 745), precoder selector 280 may select the same or another precoding matrix 315 based on additional feedback from subscriber station 111 (process step 715), and the method continues as before. However, once the communication session has ended (process step 745), the method comes to an end.

In this way, precoding may be performed whether spatial multiplexing or transmit diversity is used in wireless network 100. In addition, improved precoding may be provided by selecting a codebook 270 for each communication session that is tailored to that communication session. For example, a low-mobility user may have composite precoding matrices 315 selected from one codebook, while a high-mobility user may have composite precoding matrices 315 selected from another codebook.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station configured to perform precoding in a wireless communication system, the base station comprising:
    a codebook selector configured to select one of a plurality of codebooks for use in a communication session with a subscriber station, each codebook comprising a plurality of composite precoding matrices generated based on a corresponding diversity precoding matrix; and
    a precoder selector configured to select one of the composite precoding matrices from the selected codebook for use in communicating with the subscriber station.

2. The base station as set forth in claim 1, wherein the precoder selector is configured to select one of the composite precoding matrices from the selected codebook for use in communicating with the subscriber station for each of one or more transmission time intervals.

3. The base station as set forth in claim 1, further comprising:
    a precoder configured to precode a plurality of data streams based on the selected composite precoding matrix.

4. The base station as set forth in claim 1, further comprising:
    a precoder configured to precode a single data steam based on a transpose of the selected composite precoding matrix.

5. The base station as set forth in claim 1, wherein the diversity precoding matrix comprises a cyclic delay diversity precoding matrix.

6. The base station as set forth in claim 1, wherein the composite precoding matrices are further generated based on a power-sharing precoding matrix, the power-sharing precoding matrix comprising a Fourier-based precoding matrix.

7. The base station as set forth in claim 1, wherein the plurality of codebooks comprise a first codebook and a second codebook, the diversity precoding matrix corresponding to the first codebook is configured to provide no phase shift, and the diversity precoding matrix corresponding to the second codebook is configured to provide a phase shift.

8. The base station as set forth in claim 1, wherein the selected composite precoding matrix comprises a matrix having a number of entries based on a number of antennas used to communicate with the subscriber station.

9. The base station as set forth in claim 1, wherein the codebook selector is configured to select one of the codebooks based on a mobility of the subscriber station.

10. A channel controller configured to perform precoding in a wireless communication system, the channel controller comprising:
    a precoder configured to perform precoding on a plurality of data streams using a plurality of composite precoding matrices, each of the composite precoding matrices associated with a power-sharing precoding matrix and a diversity precoding matrix; and
    a precoder selector configured to select one of the composite precoding matrices for use in communicating with a subscriber station.

11. The channel controller as set forth in claim 9, wherein the precoder is further configured to precode a single data stream using a transpose of the selected composite precoding matrix.

12. The channel controller as set forth in claim 9, wherein the diversity precoding matrix comprises a cyclic delay diversity precoding matrix.

13. The channel controller as set forth in claim 9, wherein the power-sharing precoding matrix comprises a Fourier-based precoding matrix.

14. A method for performing precoding in a wireless communication system, the method comprising:
    storing a plurality of codebooks, each codebook comprising a plurality of composite precoding matrices that are generated based on a corresponding diversity precoding matrix;
    selecting one of the codebooks for use in a communication session with a subscriber station; and
    selecting one of the composite precoding matrices from the selected codebook for use in communicating with the subscriber station.

15. The method as set forth in claim 14, wherein selecting one of the composite precoding matrices from the selected codebook comprises selecting one of the composite precoding matrices from the selected codebook for use in communicating with the subscriber station for each of one or more transmission time intervals.

16. The method as set forth in claim 14, further comprising precoding a plurality of data streams based on the selected composite precoding matrix.

17. The method as set forth in claim 14, further comprising precoding a single data stream based on a transpose of the selected composite precoding matrix.

18. The method as set forth in claim 14, wherein the diversity precoding matrix comprises a cyclic delay diversity precoding matrix.

19. The method as set forth in claim 14, wherein the composite precoding matrices are further generated based on a power-sharing precoding matrix, the power-sharing precoding matrix comprising a Fourier-based precoding matrix.

20. The method as set forth in claim 14, wherein the plurality of codebooks comprise a first codebook and a second codebook, the diversity precoding matrix corresponding to the first codebook provides no phase shift, and the diversity precoding matrix corresponding to the second codebook provides a phase shift.

* * * * *